United States Patent [19]
Wallraff

[11] 3,930,548
[45] Jan. 6, 1976

[54] MOTORIZED SCAFFOLD ATTACHMENT

[76] Inventor: Richard J. Wallraff, 1883 Alta Vista Drive, Roseville, Minn. 55113

[22] Filed: Feb. 3, 1975

[21] Appl. No.: 546,521

[52] U.S. Cl................. 180/6.5; 180/65 R; 180/74; 182/13
[51] Int. Cl............................................ B60p 3/14
[58] Field of Search ........ 180/12, 13, 74, 65 R, 6.5; 182/13, 63

[56] References Cited
UNITED STATES PATENTS

| | | | |
|---|---|---|---|
| 2,578,886 | 12/1951 | Isherwood et al. | 180/74 |
| 2,920,845 | 1/1960 | Palmiter | 180/74 X |
| 2,949,972 | 8/1960 | Wirkkala | 180/74 X |
| 3,025,922 | 3/1962 | Savidge | 180/74 X |
| 3,431,994 | 3/1969 | Wood | 180/74 X |
| 3,438,456 | 4/1969 | Hunter | 180/65 R X |
| 3,731,758 | 5/1973 | Hibma | 180/65 R |
| 3,878,910 | 4/1975 | Walker | 180/74 X |

*Primary Examiner*—Kenneth H. Betts

[57] ABSTRACT

A small portable motorized attachment for propelling portable scaffolds from place to place is provided comprising a pair of electrically operated propulsion units adapted to detachably replace the front caster wheels of a scaffold and a control means for operating the units, each unit comprising a base having a propulsion wheel operatively connected to a friction drive means and a motor swingably cantilevered from the base with the weight of the cantilevered assembly pressing a gear driven friction drive wheel into engagement with the propulsion wheel so that the units when stably connected with one another in place on the scaffold act in unison to brake, clutch and propel the scaffold.

11 Claims, 6 Drawing Figures

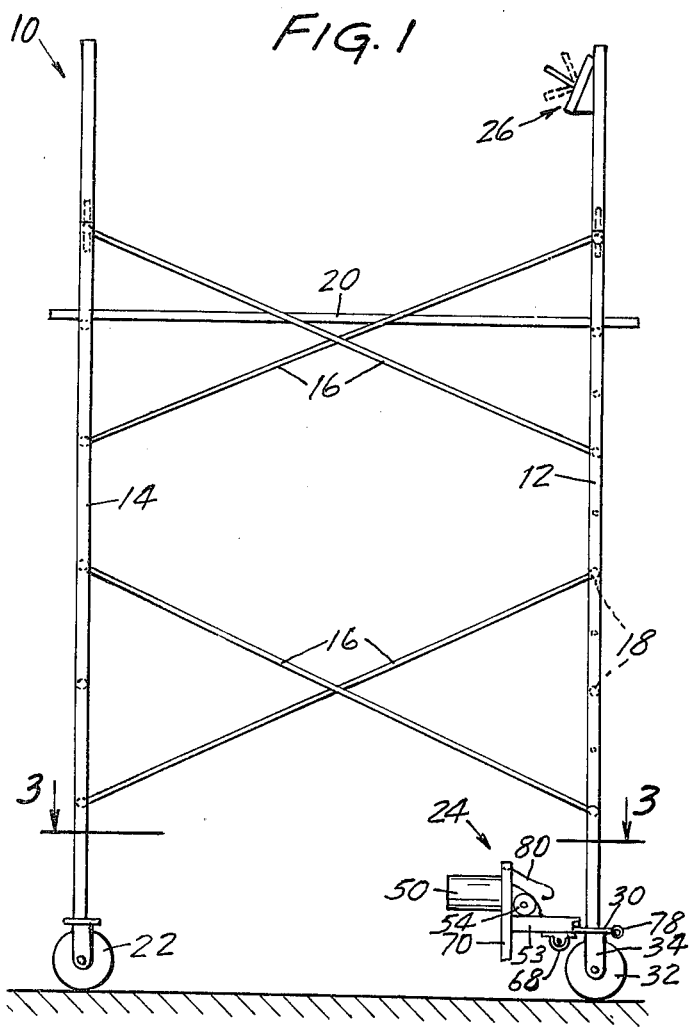
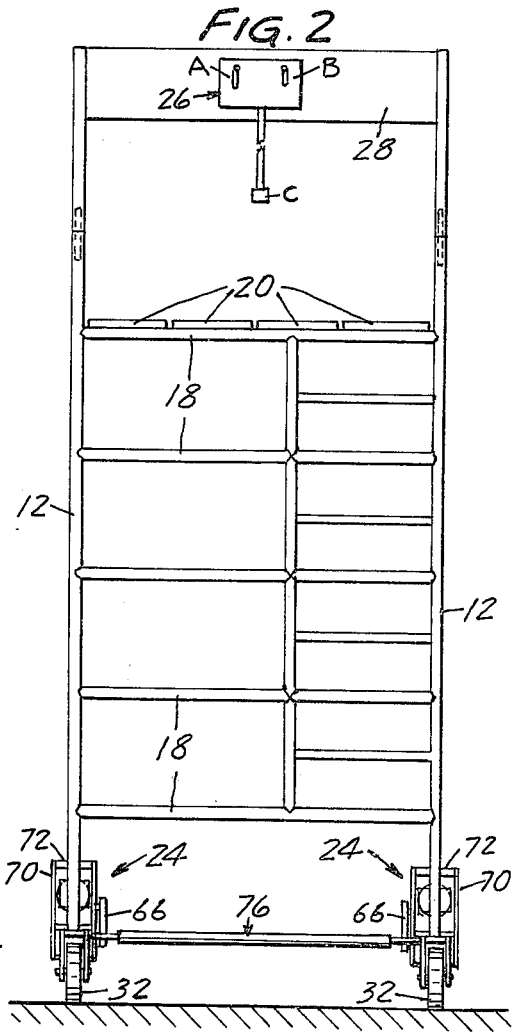
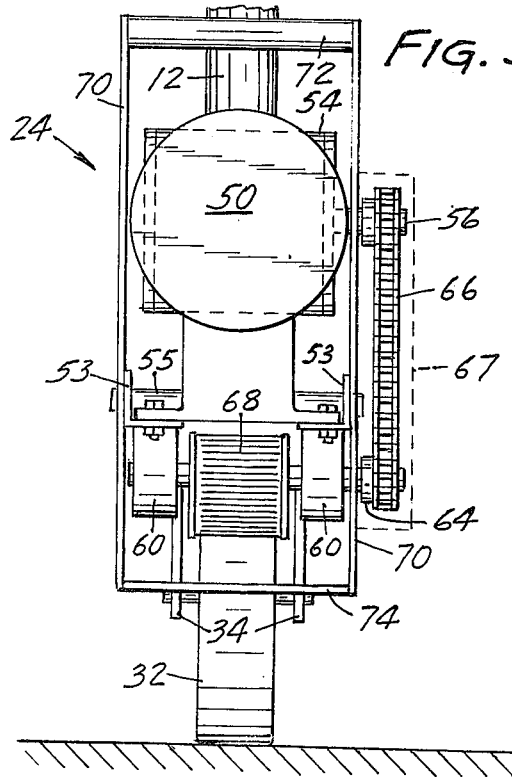
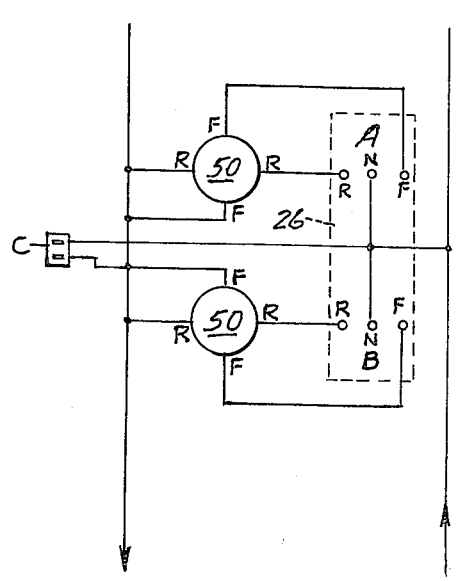

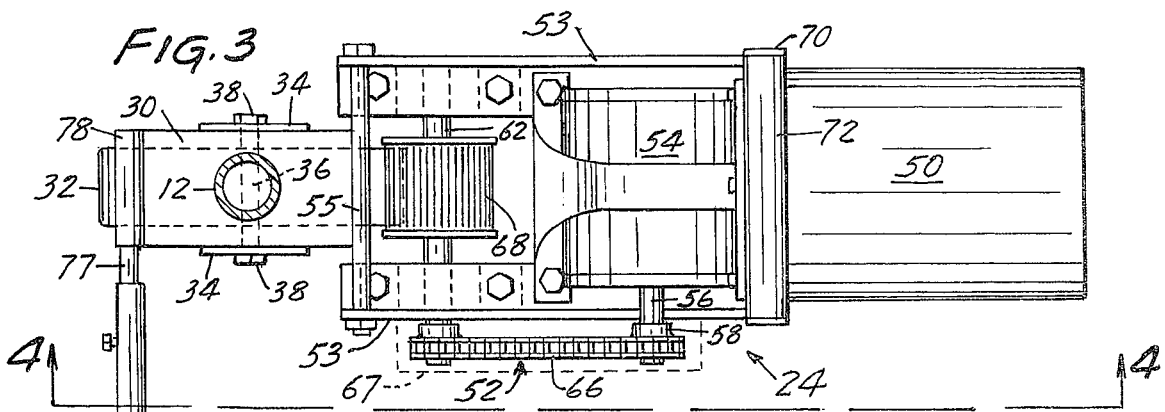
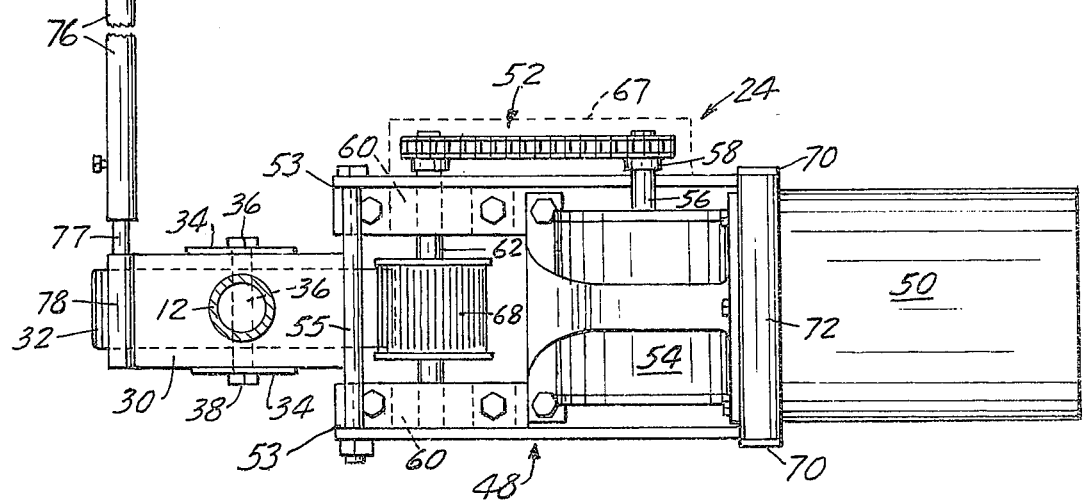

MOTORIZED SCAFFOLD ATTACHMENT

This invention relates to a motorized wheeled scaffold and more particularly relates to a motorized attachment for portable scaffolds of the type adapted to be supported by caster wheels for movement from place to place and to the individual motorized propulsion units comprising the attachment.

While not in any way restricted thereto, the present invention is particularly adapted for the self-propulsion of light duty platform supporting scaffold towers of the type generally used for overhead finishing work in the installation of wiring and lighting fixtures, duct work, ceilings and ceiling finishing operations and the like, which towers ordinarily have supporting caster wheels detachably mounted on the four corners thereof so they may be rolled from place to place. A working platform, which usually consists of planks, surfaces the upper reaches of the scaffold tower. To move the tower from place to place, a workman dismounts from the tower and pushes it or a workman at the ground or floor level is summoned to push the tower to the next work area. The economic disadvantages of this system are immediately apparent.

While the concept of self-propelled scaffolds is quite an old one, and many self-propelling scaffolding structures have been patented, to my knowledge no one has heretofore devised a safe, portable, easily-attached and detached self-propulsion attachment for standard wheeled scaffolding.

With my invention I believe I have provided a unique extremely practical easily attached and detached, small and readily stored, safe and versatile self-propelling attachment for wheeled platform supporting scaffold towers.

Essentially, the attachment comprising my invention comprises a pair of small electrically operated motorized wheeled propulsion units and control means for individually and cooperatively operating the units. Each propulsion unit comprises a base including means thereon for detachably attaching the base to the foot of a tower in place of the normal caster wheel, wheel mounting means depend downwardly from the base and have a propulsion wheel freely rotatably mounted thereon. A motor and drive means operatively interconnecting said motor and said propulsion wheel are carried by said base, the drive means including a drive wheel frictionally engaging said propulsion wheel, and means mounting said motor and drive means on said base so that effective disengagement of said drive wheel from said propulsion wheel occurs upon engagement of the propulsion wheel with an obstacle in its path.

The invention will be described in more detail in conjunction with the accompanying drawings wherein:

FIG. 1 is a side elevational view of a scaffold tower equipped with the self-propelling attachment of the present invention;

FIG. 2 is a front view of the self-propelling attachment equipped scaffold tower to FIG. 1;

FIG. 3 is a top view of the motorized propulsion units comprising the attachment mounted on the front feet of the scaffold tower taken substantially along the plane of section line 3—3 of FIG. 1;

FIG. 4 is a side view of one of the motorized wheeled propulsion units of the attachment taken substantially along the plane of section line 4—4 of FIG. 3;

FIG. 5 is a rear view of one of the motorized wheeled units; and

FIG. 6 is a wiring diagram for the operation of the electric motors of the units comprising the attachment.

Turning now to FIGS. 1 and 2, there is illustrated a conventional portable scaffolding tower 10 formed generally of tubular front and rear corner posts 12 and 14, respectively, with X-bracing 16 connecting the front and rear corner posts to one another and horizontal bracing elements 18 connecting the corner posts to one another at the front and back of the tower. A working platform 20 is provided toward the top of the tower bridging the space between the topmost front and rear bracing elements 18 of the tower for supporting workmen and their tools. Detachably mounted on the feet of the rear corner posts 14 of the scaffold are conventional caster wheels 22. Detachably mounted on the feet of the front corner posts 12 of the scaffolding tower are a pair of motorized wheeled propulsion units 24, which in conjunction with the operating means including control panel 26 attached to a railing 28 at the top of the tower comprise the attachment of my invention.

Turning now to FIGS. 3 through 5, wherein the construction of each of the propulsion units 24 is illustrated, the practical simplicity of the propulsion unit becomes immediately apparent. Each unit 24 comprises a base 30 from which depends a freely-rotatable propulsion wheel 32. Parallel legs depend from the side edges of the base plate 30 and the propulsion wheel 32 is carried on the axle 36 extending between the legs and attached at its ends to these legs as at 38. Extending upwardly from the top of the base plate is means for attaching the base plate 30 to the foot of the scaffold post 12, the means illustrated being essentially a projection 40 which seats within the lower end portion of the foot of the tubular post 12. As is illustrated in FIG. 4, the lower end portion of the post 12 may be provided with diametrically opposed holes 42 therein which line up with corresponding holes through the scaffold attaching pin 40 and a key 44 suspended from a chain 46 attached to the post may be inserted through these holes to prevent rotation of the base plate 30 and propulsion wheel 32.

Pivotally attached to the rear edge of the base plate 30 is a frame 48 which carries thereon and in fixed relation thereto an electric motor 50 and drive means 52.

In the embodiment shown the frame 48 comprises a pair of spaced horizontal parallel elements 53, which are in the form of angle irons as shown, the forward ends of which are connected by a shaft 55 extending therebetween which is in turn attached to the rear edge portion of the plate 30 so that the frame 48, and the motor 50 and drive means 52 carried by the frame, extend rearwardly from the plate for free swinging movement toward and away from the propulsion wheel 32. To the rear portion of the frame elements 53 the gear box 54 of the motor is fixedly secured. From one side of the gear box extends a drive shaft 56 having toothed gear sprocket 58 secured to the free end thereof.

To the undersurface of the forward end portion of each of the frame members 53 there is secured a pillow block 60 in which an end portion of driven shaft 62 extending between the frame members 53 is journaled. On one end of the shaft 62 is fixedly secured a toothed gear sprocket 64. An endless chain 66 interconnects the sprockets of the drive shaft 58 and the driven shaft 62. A safety chain guard 67 may be provided as shown in dotted outline. Friction drive wheel 68 is fixed to the central portion of the driven shaft 62 and normally frictionally seats against the propulsion wheel 32 on the unit, being maintained thereagainst by the weight of the motor, frame, and drive means.

Fixedly secured to the rear end of the frame elements 53 in flanking relation to the motor 50 and forming part of the frame 48 are vertical standards 70 connected to one another at their upper ends above the motor 50 by means of a cross-member 72 which constitutes a handle for carrying the unit 24 and at their lower ends by another cross-member 74 (see particularly FIG. 5). Standards 70, and cross-members 72 and 74 form a vertically disposed carrying means and supporting stand to enable ready transport and storage of each unit 24 when detached from the scaffold tower 10.

To assure stability for the propulsion units 24 when in place on the front corners of the tower 10, the units are rigidly interconnected by stabilizer means comprising stabilizer bar 76 illustrated as an elongated pipe (FIG. 3) extending between stub elements 77 which in turn fit into horizontally aligned sleeves 78 welded or otherwise securely attached to the forward end portions of the plates 30. By using pipe sections of different lengths as stabilizer bars 76, the units can accommodate scaffolds of different widths.

In order to disengage the friction wheels 68 from the propulsion wheels 32 a hook 80 is attached to each carrying handle 72 (FIG. 1) so that as the frame 48 of each unit 24 is swung upwardly about the shaft pivot 55, the hook can be attached to one of the end braces 18 thereby maintaining the friction wheel 68 of each unit out of engagement with its propulsion wheel 32.

For convenience of illustration, the electrical wiring forming the operating means controlling movement of the motorized propulsion units 24 has not been shown in FIGS. 1 through 5. However, a simplified wiring diagram is illustrated in FIG. 6 showing the leads from the motors 24 (marked "M" in FIG. 6) to the control box 26 which in the form shown has two toggle switches marked "A" and "B" for independent operation of each of the motors in the forward, reverse and neutral positions. If desired, other electrical connections such as that marked "C" can be provided from the control box for the operation of electrically powered tools from the towers.

Operation of the attachment when the propulsion units 24 thereof are attached to the front feet of a scaffold tower 10 is safe and simple. To move the scaffold forward, both units are driven forward by moving switches A and B to the forward (F) position. To move the scaffold rearward, both units are driven in the reverse direction by moving switches A and B to the reverse (R) position. To turn in a wide arc, one of the units is not powered and the other is. To turn in a narrow arc, one of the switches A and B is moved to the forward position and the other is moved to the reverse position.

Should the scaffold hit an obstacle while the units 24 are moving the scaffold, the free swinging action of the frames 48 cause the friction wheels 68 to disengage—the force required to raise the scaffold over the obstacle being much greater than the weight of the cantilevered frame and associated motor and drive means pressing the friction wheels against propulsion wheels 32. Further, by virtue of the chain drive when the units are at rest with switches A anb B in the neutral (N) position, the friction wheels 68 act as brakes and aid in preventing inadvertent movement of the scaffold.

The attachment shown is ideal for conventional tower scaffolds such as those ordinarily made up of sections about 4 feet in width by 7 feet in length and from 2 to 5 feet in height. The tower can be raised to any height desired by stacking the sections one on top of the other. Ordinarily they are raised so that the platform may be placed at the required height from floor level. For this type of scaffolding power for each unit may be supplied by a ½ horsepower electric motor so that the total weight of each propulsion unit 24 is no more than about 50 pounds. The units are thus readily transported and stored, being small enough to be readily stored and locked in construction gang boxes to avoid theft. However, it should be understood that the sizes and dimensions, weights and horsepowers, etc., given here are not restrictive of the invention but are rather indicative of typical use situations for the attachment of this invention.

That which is claimed is:

1. A self-propelling attachment for light duty platform supporting scaffold towers of the type generally used for overhead finishing work in the installation of wiring and lighting fixtures, duct work ceilings and ceiling finishing operations and the like, which towers have supporting caster wheels detachably mounted on the feet thereof so they may be rolled from place to place, said attachment comprising at least two propulsion units and operating means interconnected therewith for independent operation of said units, each propulsion unit comprising a base including means thereon for detachably attaching said base to the foot of a tower in place of the normal caster wheel, wheel mounting means depending downwardly from said base and having a propulsion wheel freely rotatably mounted thereon, a motor, and drive means operatively interconnecting said motor and said propulsion wheel, means attaching said motor and drive means to said base, said drive means including a drive wheel frictionally engaging said propulsion wheel, said means attaching said motor and drive means to said base including means causing effective disengagement of said drive wheel from said propulsion wheel upon engagement of the propulsion wheel with an obstacle in its path.

2. A self-propelling attachment for light duty platform supporting scaffold towers of the type generally used for overhead finishing work in the installation of wiring and lighting fixtures, duct work ceilings and ceiling finishing operations and the like, which towers have supporting caster wheels detachably mounted on the feet thereof so they may be rolled from place to place, said attachment comprising at least two propulsion units and operating means interconnected therewith for independent operation of said units, each propulsion unit comprising a base including means thereon for detachably attaching said base to the foot of a tower in place of the normal caster wheel, wheel mounting means depending downwardly from said base and having a propulsion wheel freely rotatably mounted thereon, frame means swingably attached to said base for swinging movement toward and away from said propulsion wheel, a motor and a drive means affixed to said frame means, said drive means including a drive wheel frictionally engaging said propulsion wheel and limiting movement of said frame means toward said propulsion wheel.

3. The attachment of claim 2 wherein said frame means includes a supporting stand and carrying means for said unit when not in use.

4. The attachment of claim 2 wherein said frame means includes a supporting stand and carrying means for said unit when not attached, and means operatively connected to said frame adapted to maintain said frame in a position such that said friction wheel remains disengaged from said propulsion wheel when said propulsion unit is attached to a scaffold.

5. The attachment of claim 2 including stabilizer means rigidly interconnecting said propulsion units to one another.

6. The attachment of claim 2 including means on each propulsion unit for attaching the drive means to a tower for maintaing the drive wheel disengaged from the propulsion wheel when it is desired to roll the scaffold by other means.

7. The attachment of claim 2 wherein said control means includes control switches remote from said drive means and flexibly interconnected therewith.

8. The attachment of claim 2 wherein said attachment includes means rigidly interconnecting said propulsion units with one another.

9. A portable propulsion means for scaffolding towers of the type having caster wheels on the feet thereof for rolling the tower from place to place, said propulsion means comprising a motorized wheeled propulsion unit having a base, means on the base for attaching the same to the foot of a scaffold tower, a freely rotatable propulsion wheel carried by said base, a motor pivotally mounted on said base for free swinging movement toward and away from said propulsion wheel, drive means rigidly attached to said motor and interconnecting said motor and said propulsion wheel, said drive means including a driven wheel frictionally engaging said propulsion wheel to propel the unit, and control means operably connected to said propulsion unit for operation remote therefrom.

10. The propulsion unit of claim 9 including a frame carrying said motor and drive means, said frame being pivotally mounted at its forward end to said base for swinging movement toward and away from said propulsion wheel on an axis parallel to the propulsion wheel axis.

11. The propulsion unit of claim 9 including a frame carrying said motor and drive means, said frame being pivotally mounted at its forward end to said base for swinging movement toward and away from said propulsion wheel on an axis parallel to the propulsion wheel axis and including at its rearward end a combination carrying means and supporting stand.

\* \* \* \* \*